(12) United States Patent
Okada (10) Patent No.: US 8,292,244 B2
(45) Date of Patent: Oct. 23, 2012

(54) DISPLAY DEVICE HAVING STAND

(75) Inventor: Yoshiyuki Okada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 231 days.

(21) Appl. No.: 12/760,208

(22) Filed: Apr. 14, 2010

(65) Prior Publication Data

US 2010/0265641 A1    Oct. 21, 2010

(30) Foreign Application Priority Data

Apr. 20, 2009   (JP) ................................. 2009-101712

(51) Int. Cl.
*A47B 96/00* (2006.01)
*H05K 7/00* (2006.01)
*G02F 1/1333* (2006.01)

(52) U.S. Cl. ........... 248/225.21; 361/679.02; 248/176.1; 248/188.1; 349/58; 348/794

(58) Field of Classification Search ............. 361/679.02, 361/679.21–679.22; 312/223.3; 248/917–918, 248/176.1, 346.01, 225.21; 345/905; 349/58; 348/794, 836

See application file for complete search history.

(56) References Cited

U.S. PATENT DOCUMENTS

| | | | |
|---|---|---|---|
| 8,196,880 B2* | 6/2012 | Fujikawa et al. | 248/188.1 |
| 8,218,305 B2* | 7/2012 | Matsutani | 361/679.21 |
| 2004/0256529 A1 | 12/2004 | Richter | |
| 2005/0139745 A1* | 6/2005 | Liao et al. | 248/346.01 |
| 2007/0002529 A1* | 1/2007 | Drew | 361/683 |
| 2007/0045505 A1* | 3/2007 | Chen | 248/558 |
| 2007/0206123 A1* | 9/2007 | Hsieh et al. | 348/794 |
| 2008/0089019 A1 | 4/2008 | Li et al. | |
| 2009/0262265 A1* | 10/2009 | Kuo et al. | 348/836 |
| 2010/0149440 A1* | 6/2010 | Yokawa | 348/836 |

FOREIGN PATENT DOCUMENTS

| | | |
|---|---|---|
| GB | 2 354 938 A | 4/2001 |
| JP | 1-104497 U | 7/1989 |
| JP | 2008-223999 | 9/2008 |

OTHER PUBLICATIONS

Extended European Search Report of corresponding EP Application No. 10 16 0240.7 dated Jul. 29, 2010.
Thornwood; "Safty Latch for Vertical Stand"; vol. 34 No. 7A; Dec. 1991.

* cited by examiner

*Primary Examiner* — Zachary M Pape
(74) *Attorney, Agent, or Firm* — Global IP Counselors (57) ABSTRACT

A flat panel display device includes a stand and a cabinet. The stand has a pair of hook portions. The hook portions are symmetrically formed relative to a plane of symmetry. The cabinet has a bottom plate with a pair of attachment holes. The attachment holes are symmetrically formed relative to the plane of symmetry. Each of the attachment holes includes a first portion and a second portion that is wider than the first portion in a transverse direction of the cabinet. The first and second portions of each of the attachment holes have inner side faces, respectively. The inner side face of the first portion and the inner side face of the second portion are offset in the transverse direction of the cabinet and connected with a slanted guide face that is slanted relative to both of the inner side faces of the first and second portions.

14 Claims, 8 Drawing Sheets

DISPLAY DEVICE HAVING STAND

CROSS-REFERENCE TO RELATED APPLICATIONS

This application claims priority to Japanese Patent Application No. 2009-101712 filed on Apr. 20, 2009. The entire disclosure of Japanese Patent Application No. 2009-101712 is hereby incorporated herein by reference.

BACKGROUND

1. Field of the Invention

The present invention generally relates to a flat panel display device. More specifically, the present invention relates to a flat panel display device having a stand and a cabinet that is fixedly coupled to the stand.

2. Background Information

A conventional flat panel display device includes a liquid crystal television set. The flat panel display device includes a liquid crystal module and a linking bracket that is fastened with screws to the lower end part of the liquid crystal module. The liquid crystal module and the linking bracket are housed in a cabinet made of a synthetic resin. The cabinet has a front cabinet and a rear cabinet. A stand for supporting the cabinet has a stand cover made of a synthetic resin and a stand core that is fastened inside the stand cover. A pair of hooks is integrally provided to a cabinet placement face of riser of the stand cover. A pair of attachment holes is made in the bottom plate of the rear cabinet. Screws are provided for fixing the stand to the cabinet.

The procedure for attaching the stand to the cabinet will be described. In a state in which the liquid crystal module is facing down and the cabinet is horizontal, the stand is grasped and the riser of the stand is moved toward the bottom plate of the cabinet. Since the hooks and the attachment holes at this point are hidden behind the stand and cannot be seen. Thus, in a state in which the hooks contact with the bottom plate, the stand is moved in upward, downward, left, and right directions to search for the attachment holes. When the hooks hook onto the attachment holes, the movement of the stand is stopped and the hooks are fitted into the attachment holes, thereby pre-fixing the stand to the cabinet. After this, screws are inserted from the inside of the stand cover, through the screw insertion holes, and are threaded into screw holes in the linking bracket, thereby fixing the stand to the cabinet. Similar attachment structure is also well known (see Japanese Laid-Open Patent Application Publication No. 2008-223999, for example).

With the conventional flat panel display device, in a state in which the hooks contact with the bottom plate of the cabinet, the stand is moved in the upward, downward, left, and right directions to search for the attachment holes. However, the hooks and the attachment holes are hidden behind the stand and cannot be seen, and furthermore the attachment holes are about the same size as the hooks. Thus, it is hard to find the attachment holes, and this makes it hard for the user to attach the stand.

SUMMARY

The present invention was conceived in light of the above-mentioned problems. One object of the present invention is to provide a flat panel display device with which a stand can be quickly and easily attached to a cabinet.

In accordance with one aspect of the present invention, a flat panel display device includes a flat panel display component, a stand and a cabinet. The stand has a top plate and a pair of hook portions. The hook portions are symmetrically formed on the top plate relative to a plane of symmetry. Each of the hook portions has a longitudinal wall and a retainer plate that is formed at a distal end portion of the longitudinal wall. The cabinet is fixedly coupled to the stand and houses the flat panel display component. The cabinet has a bottom plate with a pair of attachment holes. The attachment holes are symmetrically formed in the bottom plate relative to the plane of symmetry and engaged with the hook portions, respectively. Each of the attachment holes includes a first portion through which the longitudinal wall of a respective one of the hook portions is disposed, and a second portion that is wider than the first portion in a transverse direction of the cabinet that is perpendicular to the plane of symmetry. The first and second portions of each of the attachment holes have inner side faces, respectively. The inner side face of the first portion and the inner side face of the second portion are offset in the transverse direction of the cabinet and connected with a slanted guide face that is slanted relative to both of the inner side faces of the first and second portions.

With this flat panel display device, it is possible to provide a flat panel display device with which a stand can be quickly and easily attached to a cabinet.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the preferred embodiment are provided for illustration only and not for the purpose of limiting the invention as defined by the appended claims and their equivalents.

Figure 1A:
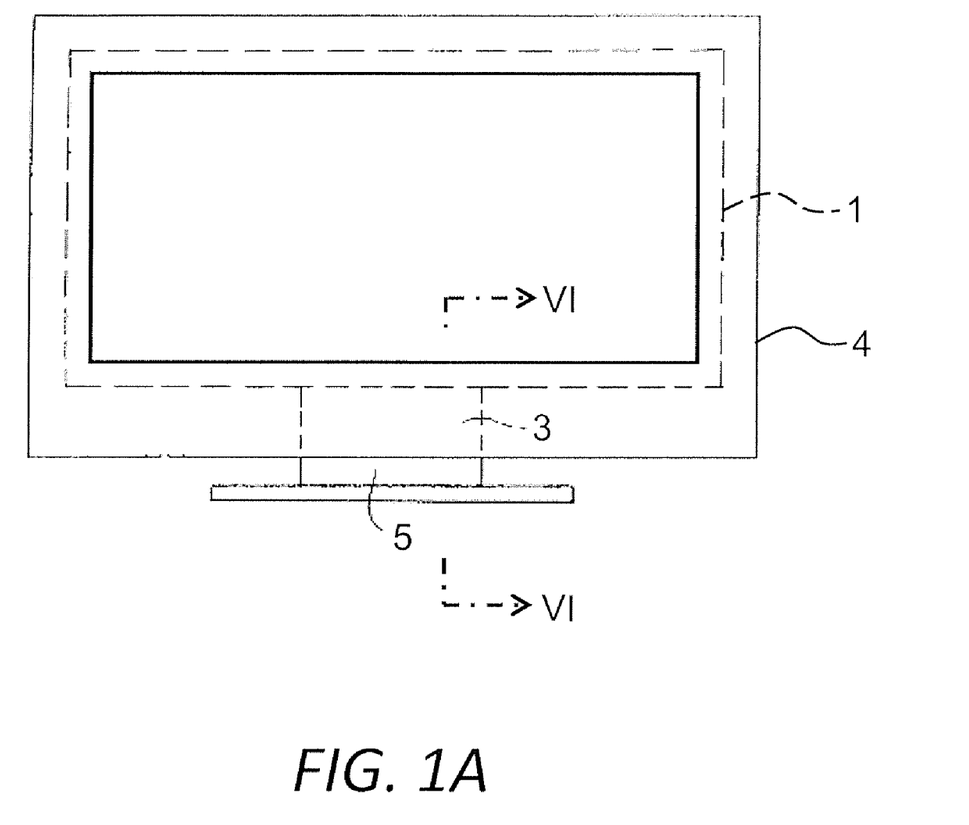
FIG. 1A is a front elevational view of a flat panel display device in accordance with one embodiment.
Figure 6:
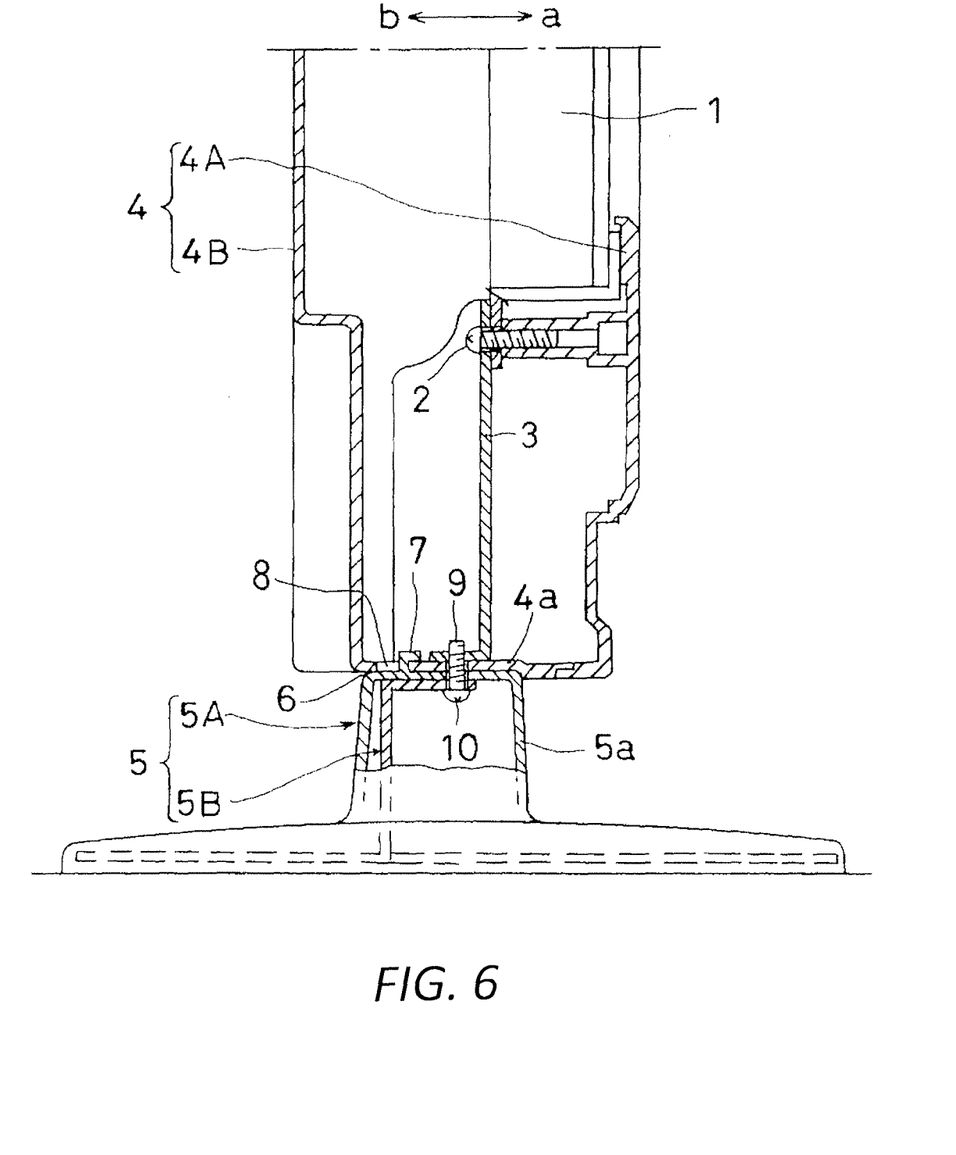
FIG. 6 is a vertical cross sectional view of the flat panel display device taken along the line VI-VI in FIG. 1A.

As shown in FIGS. 1A and 6, a flat panel display device includes a liquid crystal television set. The flat panel display device has a liquid crystal module (e.g., flat panel display component) 1, a linking bracket 3, a cabinet 4, and a stand 5.

The liquid crystal module 1 is fixed on the stand 5 via the linking bracket 3. The liquid crystal module 1 mainly includes a liquid crystal panel (e.g., liquid crystal cell) to display image. Furthermore, the liquid crystal module 1 mainly includes a frame, a light reflecting sheet, a light source, an optical sheet, and a bezel. The linking bracket 3 is fastened with screws 2 to the lower end part of the liquid crystal module 1. The liquid crystal module 1 and the linking bracket 3 are housed within the cabinet 4. The cabinet 4 is made of a synthetic resin. The cabinet 4 has a front cabinet 4A and a rear cabinet 4B, and houses the liquid crystal module 1 within an inside space (inner side) of the cabinet 4 defined by the front cabinet 4A and the rear cabinet 4B. The front cabinet 4A is rectangular when viewed from a front side of the flat panel display device, and is made of synthetic resin. The front cabinet 4A is integrally formed as a one-piece, unitary member. The rear cabinet 4B is coupled to a rear side of the front cabinet 4A, and is made of synthetic resin. The rear cabinet 4B is integrally formed as a one-piece, unitary member. The stand 5 supports the cabinet 4. The stand 5 has a stand cover 5A made of a synthetic resin and a stand core 5B that is fastened inside the stand cover 5A. The stand cover 5A has a riser 5a with a cabinet placement face (e.g., top plate) 6. A pair of hooks (e.g., hook portions) 7 is integrally formed on the cabinet placement face 6 of the riser 5a of the stand cover 5A. The stand cover 5A is integrally formed as a one-piece, unitary member. The rear cabinet 4B has a bottom plate 4a with a pair of attachment holes 8. The stand 5 is fixedly coupled to the cabinet 4 with screws 10.

Figure 1B:
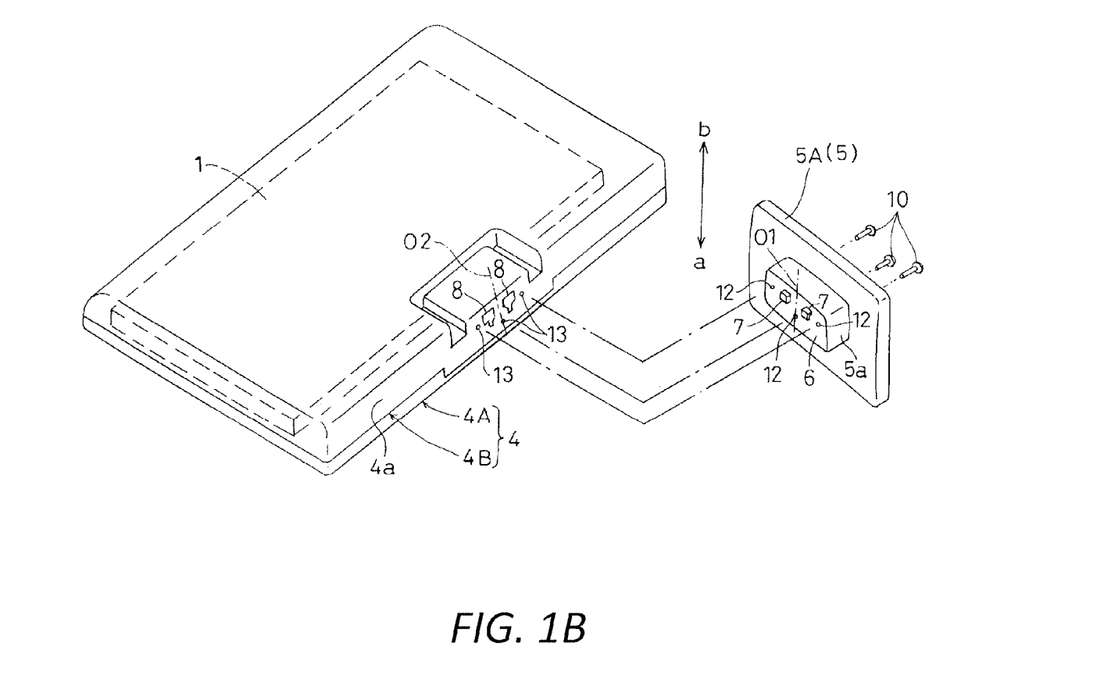
FIG. 1B is an exploded perspective view of the flat panel display device illustrated in FIG. 1A.
Figure 2A:
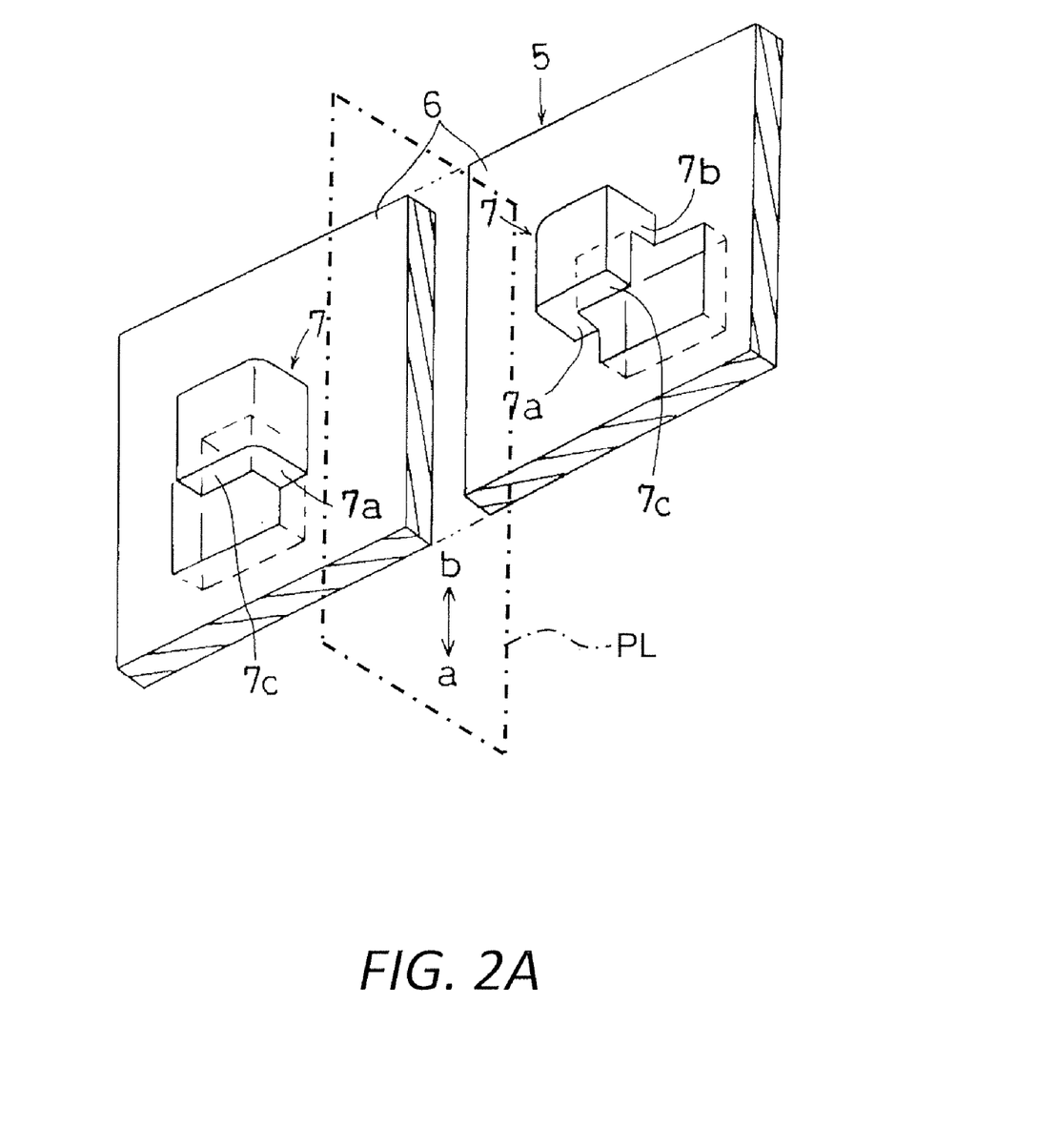
FIG. 2A is a detailed perspective view of hooks of a stand of the flat panel display device illustrated in FIG. 1A.

As shown in FIGS. 1B and 2A, the hooks 7 are disposed in line symmetry, using a center line O1 passing through the center of the cabinet placement face 6 in the longitudinal directions a and b (e.g., downward direction a and upward direction b) as a fold line when viewed from a normal direction of the cabinet placement face 6. The downward direction a is directed to a front side of the flat panel display device relative to a rear side of the flat panel display device. The upward direction b is directed to the rear side relative to the front side. More specifically, the hooks 7 are symmetrically formed on the cabinet placement face 6 relative to an imaginary plane PL of symmetry (e.g., plane of symmetry) that passes through the center line O1 and is perpendicular to the cabinet placement face 6 (i.e., mirror symmetry). Each of the hooks 7 includes a longitudinal wall 7a, a lateral wall 7b and a retainer plate 7c. The longitudinal wall 7a extends parallel to the center line O1. The lateral wall 7b is bent at a right angle from the end edge of the longitudinal wall 7a. The retainer plate 7c is bent at a right angle from the upper ends (e.g., distal end portions) of the longitudinal wall 7a and the lateral wall 7b and is parallel to the cabinet placement face 6.

Figure 2B:
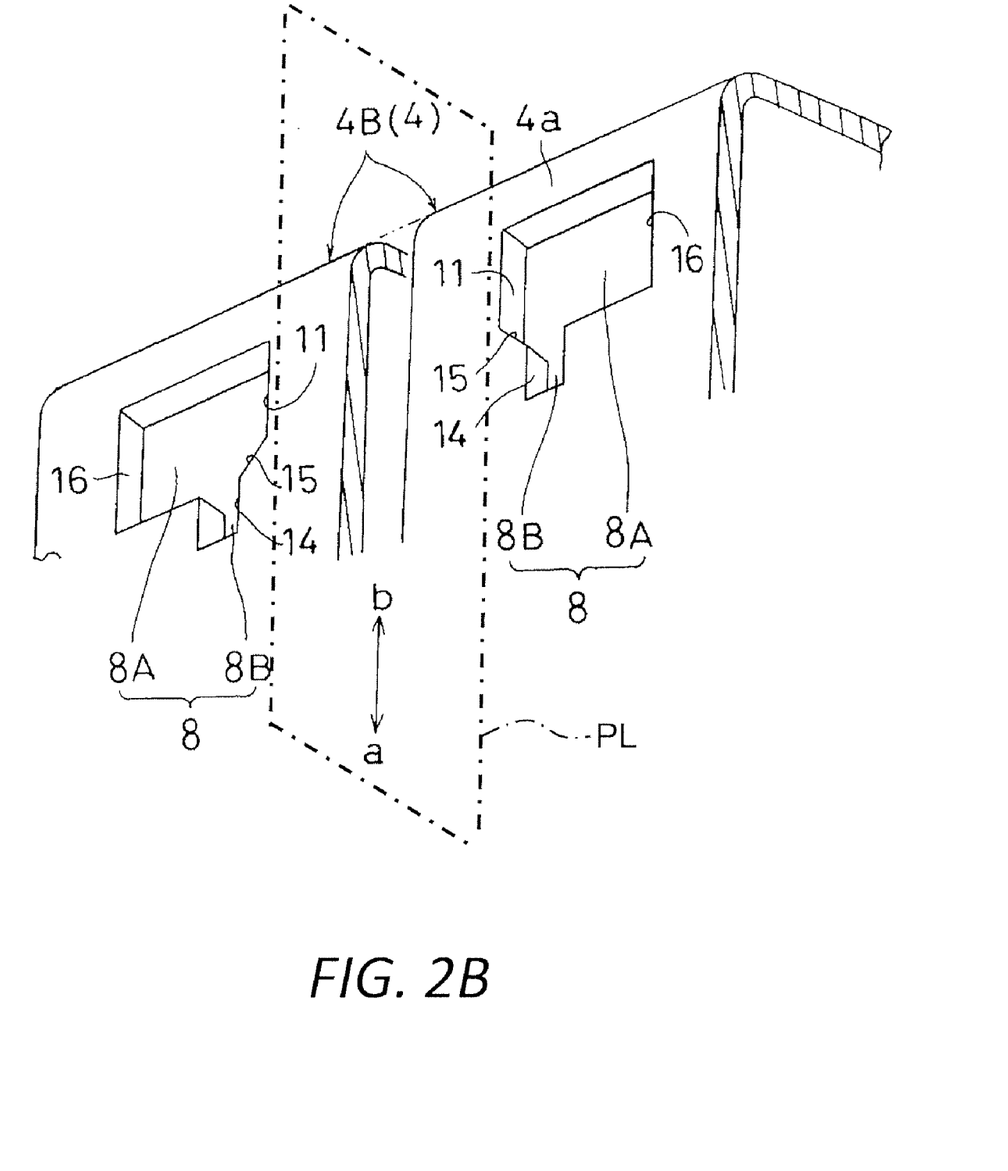
FIG. 2B is an detailed perspective view of attachment holes of a cabinet of the flat panel display device illustrated in FIG. 1A.

As shown in FIGS. 1B and 2B, the attachment holes 8 are made in linear symmetry in the bottom plate 4a of the cabinet 4, using a center line O2 passing through the center of the bottom plate 4a in the longitudinal directions a and b as a fold line when viewed from a normal direction of the bottom plate 4a. More specifically, the attachment holes 8 are symmetrically formed in the bottom plate 4a relative to the imaginary plane PL of symmetry that passes through the center line O2 and is perpendicular to the bottom plate 4a (i.e., mirror symmetry). Each of the attachment holes 8 includes a rectangular hole main body 8A for inserting a respective one of the hooks 7, and a longitudinal slot 8B that extends in the downward direction a along the center line O2 of the hole main body 8A, from the hole main body 8A. Furthermore, the cabinet placement face 6 includes screw insertion holes 12, and the bottom plate 4a includes screw insertion holes 13.

Since the attachment holes 8 are symmetrically formed, one of the attachment holes 8 (hereinafter "attachment hole 8") is explained in detail. Furthermore, since the hooks 7 are symmetrically formed, one of the hooks 7 (hereinafter "hook 7") is explained in detail. As shown in FIGS. 1B, 2A, 2B, 3A, 3B, 4A and 4B, one side edge (e.g., inner side face) 11 of the hole main body 8A of the attachment hole 8 is located closer to the center line O2 than the other side edge 16 of the hole main body 8A of the attachment hole 8. Furthermore, one side edge (e.g., inner side face) 14 of the longitudinal slot 8B of the attachment hole 8 is located closer to the center line O2 than the other side edge of the longitudinal slot 8B of the attachment hole 8. The one side edge 11 of the hole main body 8A extends parallel to the one side edge 14 of the longitudinal slot 8B. The one side edge 11 of the hole main body 8A of the attachment hole 8 is located closer to the center line O2 than the one side edge 14 of the longitudinal slot 8B of the attachment hole 8. In other words, the one side edge 11 of the hole main body 8A and the one side edge 14 of the longitudinal slot 8B are offset in transverse directions c to d (e.g., left direction c and right direction d) perpendicular to the longitudinal directions a to b by a predetermined dimension (e.g., offset dimension) S to form a step portion 17 between the one side edge 11 of the hole main body 8A and the one side edge 14 of the longitudinal slot 8B. In other words, the lateral width of the step portion 17 in the transverse directions c to d is set to the predetermined dimension S. The step portion 17 has an inclined guide face (e.g., slanted guide face) 15 with a specific inclination angle $\alpha$ (45°, for example). In particular, the inclined guide face 15 is inclined relative to both the one side edge 11 of the hole main body 8A and the one side edge 14 of the longitudinal slot 8B. Specifically, the inclined guide face 15 is inclined relative to a perpendicular direction of the one side edge 14 of the longitudinal slot 8B at the specific inclination angle $\alpha$. The inclined guide face 15 is formed corresponding to the step portion 17 between the one side edge 11 of the hole main body 8A and the one side edge 14 of the longitudinal slot 8B. The lateral width (e.g., width) t1 between the one side edge 11 of the hole main body 8A and the opposite side edge 16 of the hole main body 8A in the transverse directions c to d is set to be equal to or slightly greater than the sum (2S+t2) of the lateral width (e.g., width) t2 of the hooks 7 in the transverse directions c to d and two times of the specific dimension S of the step portion 17 (e.g., $t1 \geqq 2S+t2$). The longitudinal width (e.g., height) h1 of the hole main body 8A in the longitudinal directions a to b is set to be equal to or slightly greater than the sum (S+h2) of the longitudinal width (e.g., height) h2 of the hooks 7 in the longitudinal directions a to b and the specific dimension S of the step portion 17 ($h1 \geqq S+h2$). In particular, the longitudinal width h1 is measured from an upper side edge 18 of the hole main body 8A to a lower side edge 19 of the hole main body 8A.

Figure 4A:
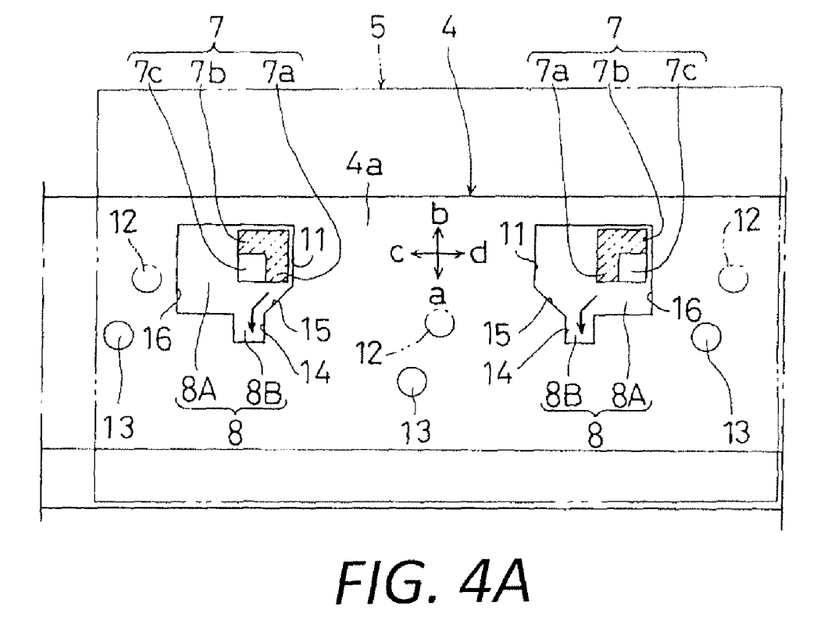
FIG. 4A is a diagram illustrating a procedure for attaching the stand to the cabinet.
Figure 4B:
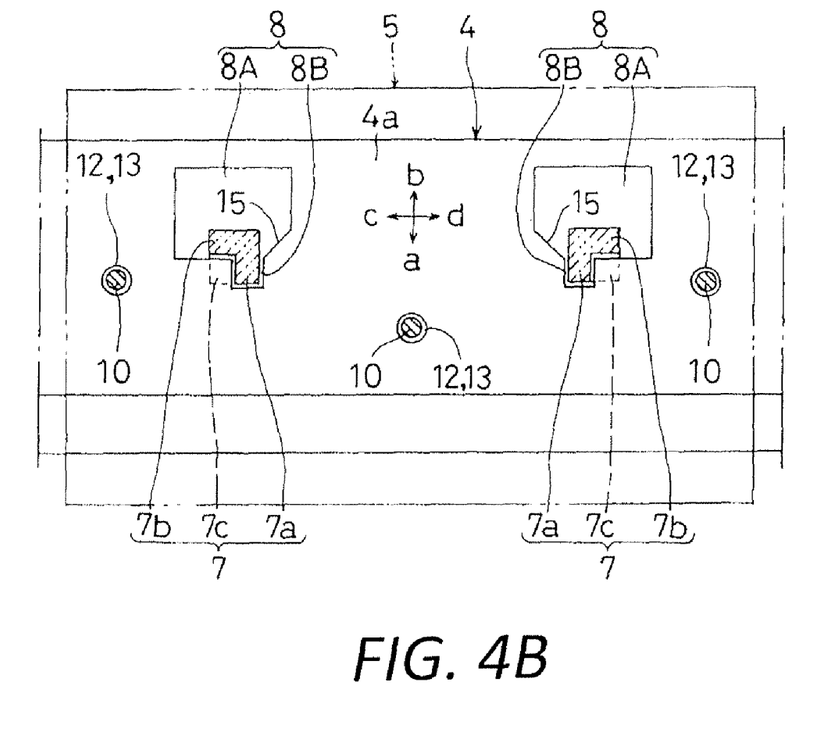
FIG. 4B is a diagram illustrating the procedure for attaching the stand to the cabinet.

The procedure for attaching the stand 5 will be described. In a state in which the liquid crystal module 1 is facing down and the cabinet 4 is horizontal, the stand 5 is grasped and the riser 5a of the stand 5 is moved toward the bottom plate 4a of the cabinet 4. Then, as shown in FIG. 4A, in a state in which the hooks 7 contact with the bottom plate 4a, the stand 5 is moved only slightly in the downward, upward, left, and right directions a to d so that the hooks 7 hook onto the hole main bodies 8A of the attachment holes 8, which allows the hooks 7 to be fitted into the hole main bodies 8A. Then, as shown in FIG. 4B, the stand 5 is moved in the downward direction a, which causes the longitudinal wall 7a of one of the hooks 7 (left hook 7 in FIG. 4A) to move along the inclined guide face 15 of one of the attachment holes 8 (left attachment hole 8). As a result, the longitudinal walls 7a of the hooks 7 are fitted into the longitudinal slots 8B of the attachment holes 8, respectively, and the retainer plates 7c are engaged with edge portions (e.g., peripheral portions) 21 of the longitudinal slots 8B formed in the bottom plate 4a, thereby pre-fixing the stand 5 to the cabinet 4. After this, the screws 10 are inserted from the inside of the stand cover 5A, through the screw insertion holes 12 and 13, and threaded into screw holes 9 formed in the linking bracket 3, thereby fixing the stand 5 to the cabinet 4 (see FIG. 6, for example).

Figure 5:
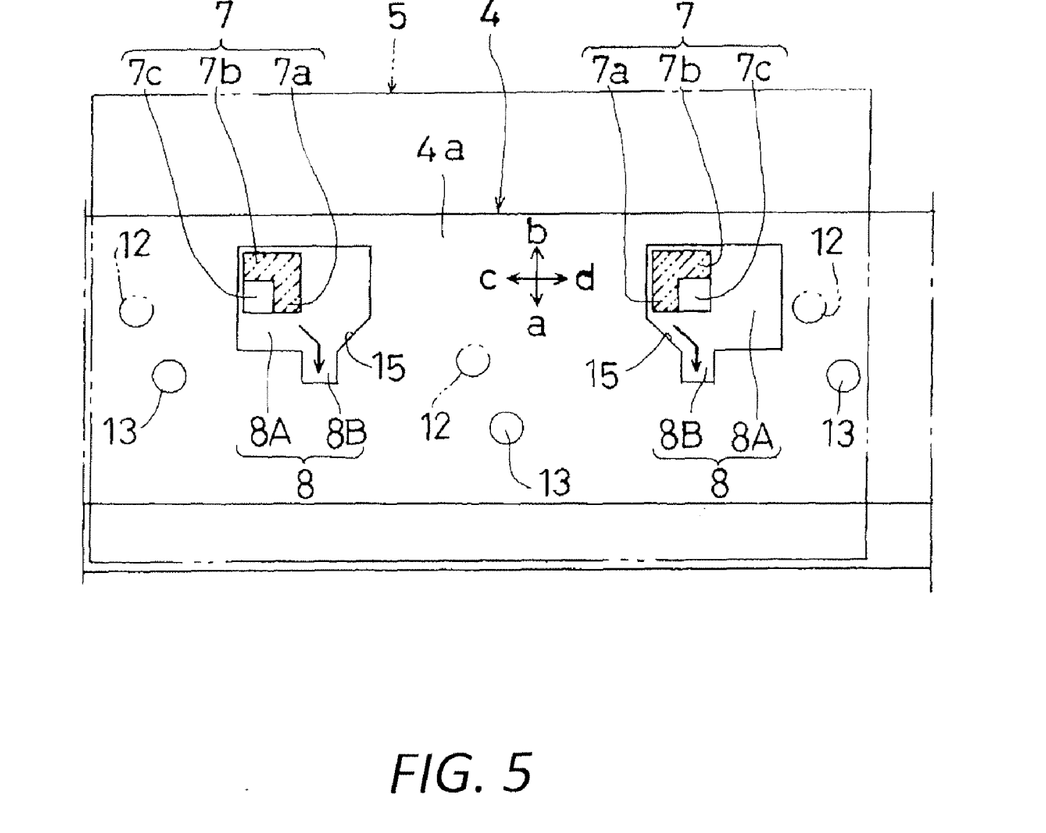
FIG. 5 is a diagrams illustrating the procedure for attaching the stand to the cabinet.

The above attachment procedure is described using as an example a case of fitting the hooks 7 on the right side within the hole main bodies 8A as shown in FIG. 4A. If the hooks 7 are instead fitted on the left side within the hole main bodies 8A as shown in FIG. 5, here again the stand 5 is moved in the downward direction a, which causes the longitudinal wall 7a of one of the hooks 7 (right hook 7 in FIG. 5) to move along the inclined guide face 15 of one of the attachment holes 8 (right attachment hole 8). As a result, the longitudinal walls 7a of the hooks 7 are fitted into the longitudinal slots 8B of the attachment holes 8 (see FIG. 4B). In other words, no matter where the hooks 7 are fitted into the hole main bodies 8A, the inclined guide faces 15 will cause the longitudinal walls 7a of the hooks 7 to be fitted into the longitudinal slots 8B of the attachment holes 8.

With the flat panel display device, in a state in which the hooks 7 contact with the bottom plate 4a of the cabinet 4, when the stand 5 is moved in the downward, upward, left, and right directions a to d to search for the attachment holes 8, the hooks 7 and the attachment holes 8 are hidden behind the stand 5 and cannot be seen. If the hole main bodies 8A of the attachment holes 8 are small, and are only about the same size as the hooks 7, then it is hard to find the hole main bodies 8A. Thus, this makes it hard for the user to attach the stand 5. However, since the hole main bodies 8A of the attachment holes 8 are set to be considerably larger than the hooks 7, the hooks 7 can be hooked straight into the hole main bodies 8A of the attachment holes 8 so that the hooks 7 are easily fitted into the hole main bodies 8A, merely by moving the stand 5 around slightly in the downward, upward, left, or right directions a to d. The size of the hole main bodies 8A is increased. Thus, the hooks 7 are easily fitted into the hole main bodies 8A. However, since this fitting alone does not position the longitudinal walls 7a in the longitudinal slots 8B, it is further necessary to move the stand 5 in the lateral directions c and d to find the longitudinal slots 8B if the attachment holes 8 do not have the inclined guide faces 15. This entails more work and makes the job harder for the user. However, the attachment holes 8 have the inclined guide faces 15. Thus, merely by moving the stand 5 from this state in the downward direction a, the longitudinal walls 7a of the hooks 7 will move along the inclined guide faces 15 and be automatically fitted into the longitudinal slots 8B of the attachment holes 8. Thus, the pre-fixing of the stand 5 to the cabinet 4 can be carried out quickly, and the user has to perform much less work than in the past.

The attachment structure is described by using a liquid crystal television set as an example. However, the attachment structure described above is not limited to this, and can be applied to various other kinds of flat panel display device, such as a liquid crystal monitor.

Figure 3A:
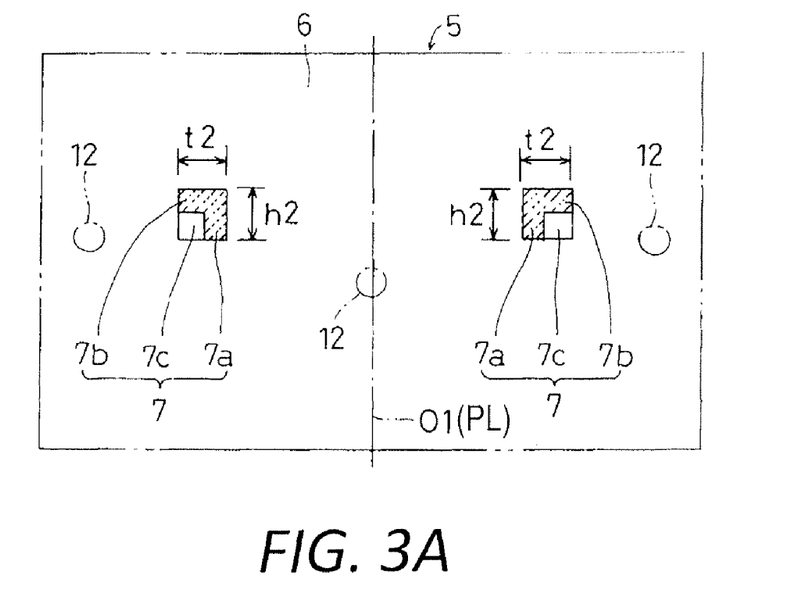
FIG. 3A is a cross sectional view of the hooks of the stand.
Figure 3B:
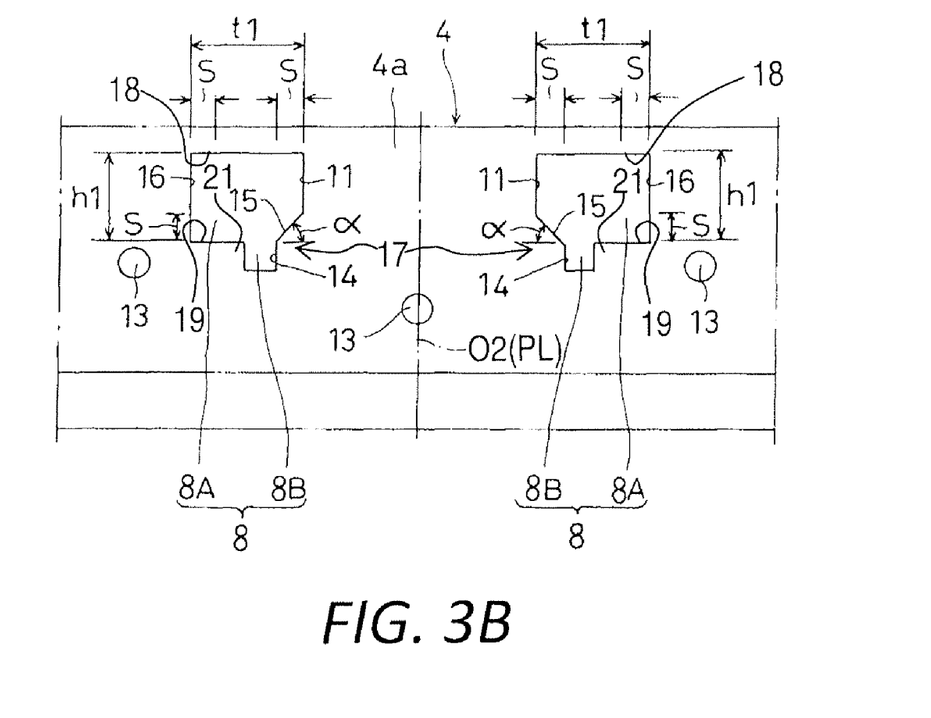
FIG. 3B is a detailed bottom plan view of the cabinet.

With the flat panel display device, the cabinet 4 has the attachment holes 8, and the stand 5 has the hooks 7. However, the flat panel display device can include a cabinet with the hooks 7, and a stand with the attachment holes 8. Moreover, the inclined guide face can be formed between the other side edge 16 of the hole main body 8A and the other side edge of the longitudinal slot 8B. Furthermore, the hook 7 can be formed to direct opposite direction such that the left hook 7 in FIG. 3A is formed as the right hook, and the right hook 7 in FIG. 3A is formed as the left hook.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a flat panel display device equipped with the present invention. Accordingly, these terms, as utilized to describe the present invention should be interpreted relative to a flat panel display device equipped with the present invention as used in the normal operating position.

While only a preferred embodiment has been chosen to illustrate the present invention, it will be apparent to those skilled in the art from these disclosures that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Furthermore, the foregoing descriptions of the preferred embodiment according to the present invention are provided for illustration only, and not for the purpose of limiting the invention as defined by the appended claims and their equivalents.

What is claimed is:

1. A display device comprising:
a display component;
a stand having a top plate and a pair of hook portions, the hook portions being symmetrically formed on the top plate relative to a plane of symmetry, each of the hook portions having a longitudinal wall and a retainer plate that is formed at a distal end portion of the longitudinal wall; and
a cabinet fixedly coupled to the stand and housing the display component, the cabinet having a bottom plate with a pair of attachment holes, the attachment holes being symmetrically formed in the bottom plate relative to the plane of symmetry and engaged with the hook portions, respectively, each of the attachment holes including a first portion through which the longitudinal wall of a respective one of the hook portions is disposed, and a second portion that is wider than the first portion in a transverse direction of the cabinet that is perpendicular to the plane of symmetry, the first and second portions of each of the attachment holes having inner side faces, respectively, with the inner side face of the first portion and the inner side face of the second portion being offset in the traverse direction of the cabinet and connected with a slanted guide face that is slanted relative to both of the inner side faces of the first and second portions,
the retainer plates of the hook portions being engaged with peripheral portions of the first portions of the attachment holes, respectively,
each of the hook portions further having a lateral wall that extends in a transverse direction of the stand that is perpendicular to the plane of symmetry from the longitudinal wall at a right angle relative to the longitudinal wall, and the retainer plates of the hook portions being parallel to the top plate of the stand.

2. The display device according to claim 1, wherein the hook portions are integrally formed with the top plate of the stand as a one piece, unitary member.

3. The display device according to claim 2, wherein each of the second portions of the attachment holes has a width measured in the transverse direction of the cabinet that is equal to or greater than a sum of a width of the respective one of the hook portions measured in the transverse direction of the stand and two times of an offset dimension by which the inner side faces of the first and second portions of each of the attachment holes are offset in the transverse direction of the cabinet.

4. The display device according to claim 3, wherein each of the second portions of the attachment holes has a height measured perpendicular to the transverse direction of the cabinet that is equal to or greater than a sum of a height of the respective one of the hook portions measured perpendicular to the transverse direction of the stand and the offset dimension.

5. The display device according to claim 4, further comprising
a linking bracket disposed within the cabinet and fixedly coupled to both the display component and the stand.

6. The display device according to claim 5, wherein the stand further has a stand cover that is made of a synthetic resin and a stand core that is disposed within the stand cover with the stand core being fixedly coupled to the stand cover, and
the linking bracket is fastened to the stand core with a screw.

7. The display device according to claim 1, wherein the first and second portions of each of the attachment holes of the cabinet extend parallel to each other.

8. A display device comprising:
a display component;
a stand having a top plate and a pair of hook portions, the hook portions being symmetrically formed on the top plate relative to a plane of symmetry, each of the hook portions having a longitudinal wall and a retainer plate that is formed at a distal end portion of the longitudinal wall; and
a cabinet fixedly coupled to the stand and housing the display component, the cabinet having a bottom plate with a pair of attachment holes, the attachment holes being symmetrically formed in the bottom plate relative to the plane of symmetry and engaged with the hook portions, respectively, each of the attachment holes including a first portion through which the longitudinal wall of a respective one of the hook portions is disposed, and a second portion that is wider than the first portion in a transverse direction of the cabinet that is perpendicular to the plane of symmetry, the first and second portions of each of the attachment holes having inner side faces, respectively, with the inner side face of the first portion and the inner side face of the second portion being offset in the traverse direction of the cabinet and connected with a slanted guide face that is slanted relative to both of the inner side faces of the first and second portions,
each of the hook portions further having a lateral wall that extends in a transverse direction of the stand that is perpendicular to the plane of symmetry from the longitudinal wall at a right angle relative to the longitudinal wall, and
the retainer plates of the hook portions being parallel to the top plate of the stand.

9. The display device according to claim 8, wherein the hook portions are integrally formed with the op plate of the stand as a one piece, unitary member.

10. The display device according to claim 9, wherein each of the second portions of the attachment holes has a width measured in the transverse direction of the cabinet that is equal to or greater than a sum of a width of the respective one of the hook portions measured in the transverse direction of the stand and two times of an offset dimension by which the inner side faces of the first and second portions of each of the attachment holes are offset in the transverse direction of the cabinet.

11. The display device according to claim 10, wherein each of the second portions of the attachment holes has a height measured perpendicular to the transverse direction of the cabinet that is equal to or greater than a sum of a height of the respective one of the hook portions measured perpendicular to the transverse direction of the stand and the offset dimension.

12. The display device according to claim 11, further comprising
a linking bracket disposed within the cabinet and fixedly coupled to both the display component and the stand.

13. The display device according to claim 12, wherein the stand further has a stand cover that is made of a synthetic resin and a stand core that is disposed within the stand cover with the stand core being fixedly coupled to the stand cover, and
the linking bracket is fastened to the stand core with a screw.

14. The display device according to claim 8, wherein the first and second portions of each of the attachment holes of the cabinet extend parallel to each other.

* * * * *